United States Patent

[11] 3,537,421

[72] Inventor Benito Carmine Zannini
 Cranston, Rhode Island
[21] Appl. No. 732,125
[22] Filed May 27, 1968
[45] Patented Nov. 3, 1970
[73] Assignee International Telephone and Telegraph Corporation
 New York, New York
 a corporation of Delaware

[54] SPLIT COUPLER WITH ATTACHED INDICATOR DEVICE
 6 Claims, 1 Drawing Fig.
[52] U.S. Cl. .................................................. 116/114,
 287/111
[51] Int. Cl. ............................................. G01d 21/00
[50] Field of Search ............................................. 116/114,
 125, 124.11; 285/93, 373, 419; 287/117, 111;
 251/225

[56] References Cited
UNITED STATES PATENTS

| | | | |
|---|---|---|---|
| 1,179,661 | 4/1916 | Selah.............................. | 287/111X |
| 2,826,081 | 3/1958 | Campbell....................... | 287/111X |
| 3,203,717 | 8/1965 | Jahn................................ | 287/111 |
| 3,415,552 | 12/1968 | Howlett......................... | 287/117 |

Primary Examiner—Louis R. Prince
Assistant Examiner—William A. Henry, II
Attorneys—C. Cornell Remsen, Jr., Rayson P. Morris, Percy P. Lantzy, J. Warren Whitesel and Delbert P. Warner ABSTRACT: A threaded nipple is sawed apart, and the resulting two halves are joined together by a stainless steel spring. The spring serves to preserve perfectly aligned threads which facilitate snapping the coupler over the ends of threaded rods, and to point at a scale to indicate the longitudinal displacement of the rod.

Patented Nov. 3, 1970 3,537,421
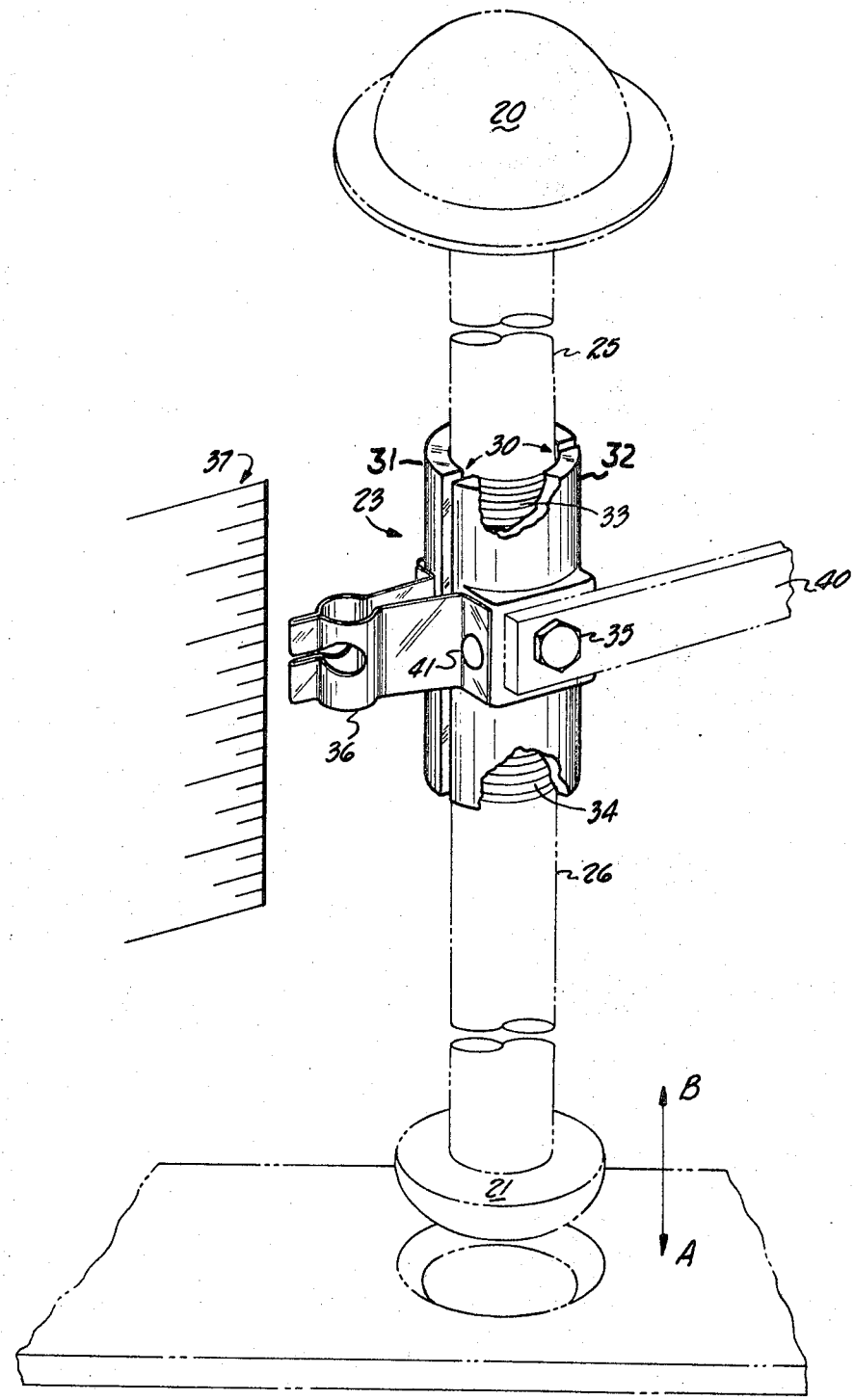
INVENTOR
B.C. ZANNINI
ATTORNEY

3,537,421

SPLIT COUPLER WITH ATTACHED INDICATOR DEVICE

This invention relates to couplers for joining two rods, possibly having different diameters.

The invention finds utility in many different applications. However, it has been designed with a particular thought about a special utility in connection with automatically operated valve devices; therefore, the following speaks of valves, but it must be understood that the invention is not necessarily limited thereto.

Very often, it is necessary to provide additional functions, as when joining two rods or pipes having different diameters. These functions provide a vertical indicator to disclose any longitudinal displacement of the rods and provide a point for connecting an actuating or actuated lever to the rods. It is also desirable for the connector, indicator, and actuator to be attached or removed, very quickly and easily, without disturbing associated equipment.

Heretofore, it has been common practice to thread the two ends of the rods where they are to be joined together. The coupler is commonly in the form of a sleeve having two aligned, threaded holes therein. Then, the sleeve is sawed apart by a cut passing through the center of the aligned holes. This provides two mating halves or a split coupler which fits together over the threaded ends of the rod. Thereafter, a suitable bolt or other device is used to join the halves of the split coupler. Thus, the two coupler halves are joined together as a unit without actually having to go through the labor of turning the rods into the threaded holes in the coupler. This is especially useful when the other ends of the rods are already joined to something so that they cannot be easily turned.

There are a number of disadvantages to the usual coupler of the type described above. First and foremost, it is very difficult for an installer to perform the chores of: (1) holding together the two halves of the threaded coupler, (2) adding an indicator, and (3) an actuator, and (4) bolting the entire assembly together. Considering the fact that a person only has two hands, it requires a highly skilled installer who is able to hold many loose parts together simultaneously and in perfect alignment while threading and turning the bolts into position.

A further problem results when the threads do not align perfectly as the two halves of the split coupler are placed around the threaded ends of the rods. A result is cross threading. When the rod is moved, the threads receive an undue amount of wear and there is a failure in the field.

Another problem occurs in inventory control. The person doing the installation usually loses a few pieces and ends up with an unequal number of left and right halves. Then, he has to draw unequal numbers from inventory. Thus, the units cannot be put together without an unduly large amount of spoilage. There is a waste of unmatched halves, and often a waste of time trying to match halves.

Accordingly, an object of the invention is to provide new and improved split couplers. In this connection, an object is to provide a complete assembly having the economy and ease of a split coupler without sacrificing the perfect thread alignment, and easy inventory control of a nonsplit coupler.

Yet another object of the invention is to provide a low cost unit serving the three functions of coupling, indicating, and actuating.

The above mentioned, and other features and objects of this invention and the manner of obtaining them, will become more apparent, and the invention itself will be best understood by reference to the following description of an embodiment of the invention taken in conjunction with the accompanying drawing, in which the single sheet of drawings shows (in solid lines) a perspective view of the inventive split coupler incorporating the invention, and (in dot-dashed lines) the associated equipment.

As shown in dot-dashed lines in the attached drawing, a valve control mechanism 20 drives a valve 21 in any suitable manner. For example, changes of pneumatic pressure in a chambered element may cause the control mechanism 20 to raise or lower the valve 21. The actuator 20, may have any of many different forms depending upon the associated controlling elements and the force required to operate the valve mechanism. Likewise, the valve 21 may also have any of many different configurations depending upon the functions which it is supposed to perform. Thus, it is a common practice for manufacturers to make a full line of each of these two elements 20, 21 and to join an appropriate two of them together with a coupler 23 when an installation is made.

The simplest way of making the coupler 23 would be to simply have a threaded nipple and to turn the threaded ends of the rods 25, 26 into the nipple. This would mechanically join the associated actuator 20 with the valve 21, so that their longitudinal forces would act together toward a common end. However, this is not always possible since both the actuator 20 and the valve 21 may be rigidly secured in place, and the rods 25, 26 cannot be conveniently turned.

Accordingly, it is common practice to split the threaded coupler 23, as by sawing it apart at 30, so that two mating halves 31, 32 are formed. These two halves may be placed on opposite sides of rods 25, 26 with threads 33, 34 on coupler and rods mating. The halves 31, 32 are then secured in place by any suitable holding means, such as a bolt 35. In addition, the coupler 23 normally carries an indicator 36, which points at a scale 37 to visually indicate the displacement of the valve 21 as it moves in either of the two directions A or B responsive to the action of the controller 20. In addition, it is often desirable to provide an actuating lever 40 which may be either a means for assisting in the motion of the valve 21 or means for feeding back a precise indicating of the valve movement.

The problem is to hold all of the piece parts 31—40 in perfect alignment while the bolt 35 is being tightened.

According to one aspect of the invention, these and other problems are solved by making the indicator 36 from a relatively strong material having a springlike quality, such as stainless steel for example. During manufacture, the two halves 31, 32 of the split coupler 23 are placed around the threaded ends of rods (similar to 25, 26) which are parts of a jig assembly. Then, a vise is closed to hold the separate coupler halves in a fixed position; care may be taken here in order to have perfectly aligned coupler halves threaded over the rod ends. Two rivets such as 41 are then driven through the ends of the spring indicator 36, thus securing the three-piece parts 31, 32, 36 in a fixed relationship with respect to each other.

When a pump installation is thereafter made in the field, the installer has only to pick up a single-piece part which includes both halves of the split coupler and the spring indicator. These halves may be sprung apart and slipped over the threaded ends of two rods 25, 26 where the installer may match the threads into a perfectly aligned position by feel. When the two halves 31, 32 are properly aligned, on the ends of the rods 25, 26 the spring forces in indicator 36, holds them in position without requiring the installer to devote any of his attention to so holding the parts. Then it becomes a simple matter for him to attach the actuator 40 by inserting the bolt 35 through aligned holes in the actuator and in the two halves 31, 32.

While the principles of the invention have been described above in connection with specific apparatus and applications, it is to be understood that this description is made only by way of example and not as a limitation on the scope of the invention.

I claim:

1. A split coupler comprising two mating halves of a threaded nipple which is separated in a plane running approximately through the center of the nipple, a spring means for resiliently joining these two halves together, means for rigidly securing the two halves together, and indicator means cooperatingly associated with said spring means for indicating the longitudinal displacement of said coupler.

2. The coupler of claim 1 and an actuator attached to said coupler by said rigidly securing means.

3. The combination comprising a valve control means having a first rod associated therewith for transmitting control forces, a valve having a second rod associated therewith for receiving said control forces, split coupler means having two halves for joining said first and second rods, a resilient means for holding said two halves in matched pairs, and bolts for rigidly joining said two coupler halves.

4. The combination of claim 3 and position indicating means adjacent said resilient means for indicating the position of said valve.

5. The combination of claim 3 wherein the ends of said rods are threaded and said coupler is a threaded nipple, the threads in said nipple matching the threads on the ends of the rods.

6. The combination of claim 3 further comprising an actuator attached to said coupler halves by said bolts.